US010063881B2

United States Patent
Hong et al.

(10) Patent No.: US 10,063,881 B2
(45) Date of Patent: Aug. 28, 2018

(54) APPARATUS AND METHOD FOR SETTING SEARCH REGION FOR PREDICTING MOTION VECTOR

(71) Applicant: Foundation of Soongsil University-Industry Cooperation, Seoul (KR)

(72) Inventors: Min-Cheol Hong, Seoul (KR); Jin-Young Noh, Seoul (KR); Myoung-Jin Kim, Seoul (KR)

(73) Assignee: Foundation of Soongsil University-Industry Cooperation, Seoul (KR)

( * ) Notice: Subject to any disclaimer, the term of this patent is extended or adjusted under 35 U.S.C. 154(b) by 711 days.

(21) Appl. No.: 14/584,573

(22) Filed: Dec. 29, 2014

(65) Prior Publication Data

US 2015/0117543 A1    Apr. 30, 2015

Related U.S. Application Data

(63) Continuation of application No. PCT/KR2012/008962, filed on Oct. 29, 2012.

(30) Foreign Application Priority Data

Jun. 27, 2012 (KR) .................. 10-2012-0069112

(51) Int. Cl.
*H04N 19/57* (2014.01)
*H04N 19/56* (2014.01)
(Continued)

(52) U.S. Cl.
CPC ............ *H04N 19/57* (2014.11); *H04N 19/52* (2014.11); *H04N 19/533* (2014.11); *H04N 19/56* (2014.11)

(58) Field of Classification Search
CPC ...... H04N 19/56; H04N 19/533; H04N 19/52; H04N 19/57; H04N 7/50; H04N 7/26244;
(Continued)

(56) References Cited

U.S. PATENT DOCUMENTS

| 2003/0039311 A1* | 2/2003 | Ohira | H04N 5/145 375/240.16 |
|---|---|---|---|
| 2003/0142749 A1* | 7/2003 | Hong | H04N 19/51 375/240.16 |

(Continued)

FOREIGN PATENT DOCUMENTS

| KR | 20070092481 A | 9/2007 |
|---|---|---|
| KR | 20110024561 A | 3/2011 |

(Continued)

OTHER PUBLICATIONS

"Adaptive Search Window Size Algorithm for Fast Motion Estimation in H.264/AVC Standard".*
(Continued)

*Primary Examiner* — Mohammed Jebari
(74) *Attorney, Agent, or Firm* — Mintz Levin Cohn Ferris Glovsky and Popeo, P.C.; Kongsik Kim; Jonathon Western (57) ABSTRACT

An apparatus and a method for setting a search region for the predicting of a motion vector are disclosed. The apparatus for setting a search region for predicting a motion vector includes: a computation unit configured to compute differences between an origin vector of a search region for a target block for motion vector prediction and predictive motion vectors of multiple blocks adjacent to the target block, and compute a sum of absolute values of the differences; and a search region setting unit configured to set a range value of the search region for the target block by using at least one of the sum of absolute values of the differences and a directionality of the predictive motion vectors for the mul-
(Continued)

tiple adjacent blocks. According to an embodiment of the present invention, the amount of computation and the time expended for computation when predicting motion vectors can be significantly reduced.

2 Claims, 9 Drawing Sheets (51) Int. Cl.
H04N 19/52 (2014.01)
H04N 19/533 (2014.01)
(58) Field of Classification Search
CPC . H04N 5/145; H04N 7/26765; H04N 7/26015
See application file for complete search history.

(56) References Cited

U.S. PATENT DOCUMENTS

| | | | | |
|---|---|---|---|---|
| 2006/0120452 A1* | 6/2006 | Li | | H04N 5/145 375/240.16 |
| 2008/0170616 A1* | 7/2008 | Hwang | | H04N 19/105 375/240.16 |
| 2010/0110302 A1* | 5/2010 | Yokoyama | | H04N 19/53 348/699 |
| 2010/0246681 A1* | 9/2010 | Wang | | H04N 19/00024 375/240.16 |
| 2011/0135001 A1* | 6/2011 | Yang | | H04N 5/145 375/240.16 |
| 2011/0141348 A1* | 6/2011 | Jia | | G06T 3/4053 348/441 |
| 2012/0076203 A1* | 3/2012 | Sugimoto | | H04N 19/105 375/240.03 |
| 2013/0114689 A1* | 5/2013 | Chang | | H04N 19/597 375/240.03 |

FOREIGN PATENT DOCUMENTS

KR 20110048243 A 5/2011
KR 20120055761 A 6/2012

OTHER PUBLICATIONS

Kim et al. "Fast Motion Estimation Using Local Statistics of Neighboring Motion Vectors." *J. Broadcast Eng.* 13.1(2008):128-136. (Korean original and English abstract).

* cited by examiner

FIG. 1

RELATED ART

FIG. 2

RELATED ART

APPARATUS AND METHOD FOR SETTING SEARCH REGION FOR PREDICTING MOTION VECTOR

CROSS-REFERENCE TO RELATED APPLICATIONS

This application is a continuation of International Application No. PCT/KR2012/008962 filed on Oct. 29, 2012, which claims priority to Korean Application No. 10-2012-0069112 filed on Jun. 27, 2012. The applications are incorporated herein by reference.

TECHNICAL FIELD

Embodiments of the present invention relate to an apparatus and a method for setting a search region for the predicting of a motion vector, more particularly to an apparatus and a method for setting a search region for predicting a motion vector that can significantly reduce the amount of and time expended for computation when predicting the motion vector.

BACKGROUND ART

Most video encoding formats, including the H.264/AVC standard, entail the prediction of motion vectors within a certain search region based on block matching.

Figure 1:
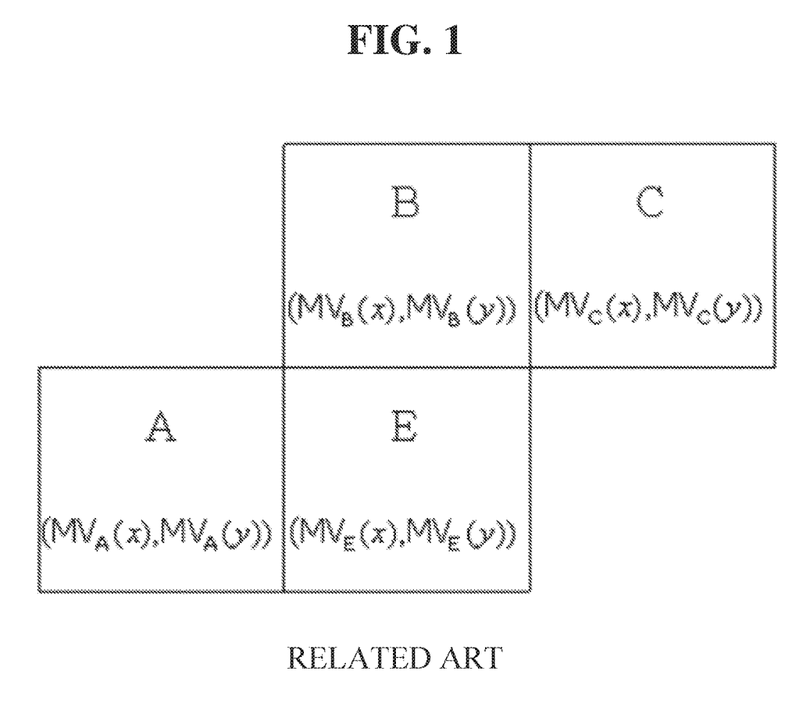
FIG. 1 and FIG. 2 illustrate the concept of a typical method of motion vector prediction according to the related art.
Figure 2:
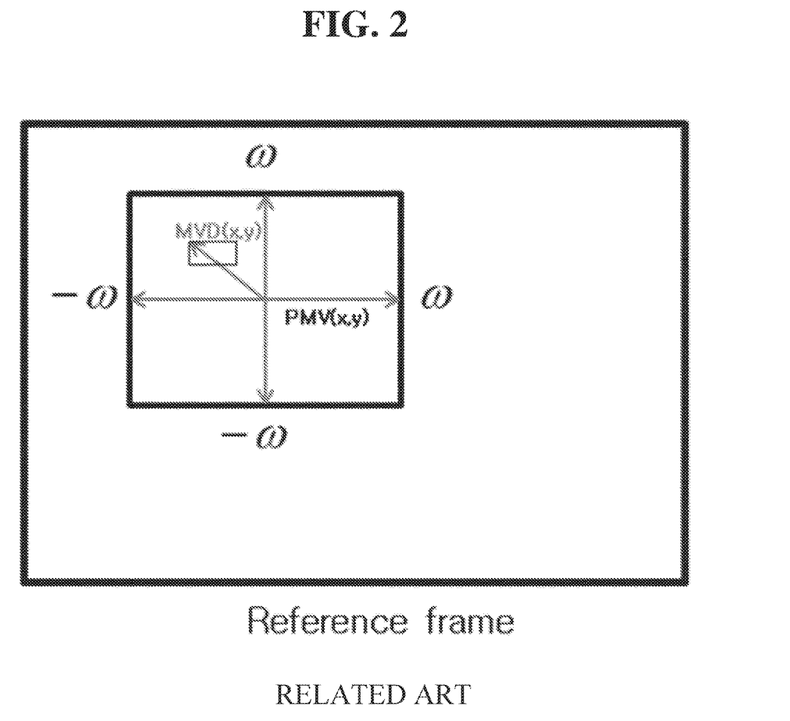

FIG. 1 and FIG. 2 illustrate the concept of a typical method of motion vector prediction according to the related art.

First, referring to FIG. 1, suppose that the target block for which motion vector prediction is to be performed is block E, and that block A, block B, and block C are blocks (i.e. previous target blocks) for which motion vector prediction was performed prior to block E. Then, the origin of the search region for the motion vector prediction for block E may be defined as the predictive motion vector (PMV), expressed as Equation 1 shown below.

$$PMV(i)=\text{median}(MV_A(i), MV_B(i), MV_C(i)) \text{ for } i=x,y \quad \text{[Equation 1]}$$

Here, median(.) represents a function outputting a median of the input values, $MV_A(i)$, $MV_B(i)$, and $MV_A(i)$ represent the motion vectors predicted for block A, block B, and block C, respectively, x represents the horizontal component of a vector, and y represents the vertical component of a vector.

Thus, the origin of a search region may be chosen for the horizontal direction and the vertical direction, and the prediction of a motion vector for a target block may be performed within the search region. Also, the search region may be centered at the PMV, and the widths may be determined by a range value (ω) for the search region that is set beforehand for the horizontal direction and vertical direction.

FIG. 2 illustrates an example of a search region for a motion vector set that is for a target block. The search region can be expressed as Equation 2 shown below.

$$-\omega \leq dx \leq \omega$$

$$-\omega \leq dy \leq \omega \quad \text{[Equation 2]}$$

Here, dx represents the search region in the horizontal direction, and dy represents the search region in the vertical direction. Thus, the preset range value (ω) may be a half of the width of the search region (i.e. a half-width value) in the horizontal direction and vertical direction.

The prediction of the motion vector for a target block having the (U, V)-th MN size in a search region set as in FIG. 2 and Equation 2 can be performed by using the position at which the sum of absolute differences (SAD), defined as in Equation 3 shown below, is the smallest.

$$SAD_{dx,dy} = \sum_{j=0}^{N-1} \sum_{i=0}^{M-1} |C(k \cdot l) - R(k+m, l+n)| \quad \text{[Equation 3]}$$

$$k = U \times M + i,$$

$$l = V \times N + j$$

$$m = dx + PMV(x),$$

$$n = dy + PMV(y)$$

Here, C and R represent the current image and a reference image for the prediction of the motion vector.

In this case, the motion vector difference (MVD), expressed as in Equation 4 shown below, may be calculated by using the (dx, dy) that yields the smallest SAD in the search region, and this MVD may be transmitted as a result of the motion vector prediction.

$$MVD(i)=MV(i)-PMV(i) \text{ for } i=x,y \quad \text{[Equation 4]}$$

Here, MV(i) represents the motion vector predicted for the target block.

However, the method of motion vector prediction based on the related art as described above requires a large amount of computation, and thus its application to various services may be limited.

SUMMARY

An aspect of the present invention is to propose an apparatus and a method for setting a search region for predicting a motion vector that can significantly reduce the amount of and time expended for computation when predicting the motion vector.

Other objectives of the present invention can be derived from the embodiments described below by those of ordinary skill in the art.

One embodiment of the present invention provides an apparatus for setting a search region for predicting a motion vector that includes: a computation unit configured to compute differences between an origin vector of a search region for a target block for motion vector prediction and predictive motion vectors of multiple blocks adjacent to the target block, and compute a sum of absolute values of the differences; and a search region setting unit configured to set a range value of the search region for the target block by using at least one of the sum of absolute values of the differences and a directionality of the predictive motion vectors for the multiple adjacent blocks.

Another embodiment of the present invention provides a method for setting a search region for predicting a motion vector that includes: computing differences between an origin vector of a search region for a target block for motion vector prediction and predictive motion vectors of multiple blocks adjacent to the target block, and computing a sum of absolute values of the differences; and setting a range value of the search region for the target block by using at least one of the sum of absolute values of the differences and a directionality of the predictive motion vectors for the multiple adjacent blocks.

According to an embodiment of the present invention, the amount of computation and the time expended for computation when predicting motion vectors can be significantly reduced.

DETAILED DESCRIPTION

As the present invention allows for various changes and numerous embodiments, particular embodiments will be illustrated in the drawings and described in detail in the written description. However, this is not intended to limit the present invention to particular modes of practice, and it is to be appreciated that all changes, equivalents, and substitutes that do not depart from the spirit and technical scope of the present invention are encompassed in the present invention. In describing the drawings, like reference numerals are used for like components.

Certain embodiments of the invention are described below in more detail with reference to the accompanying drawings.

Figure 3:
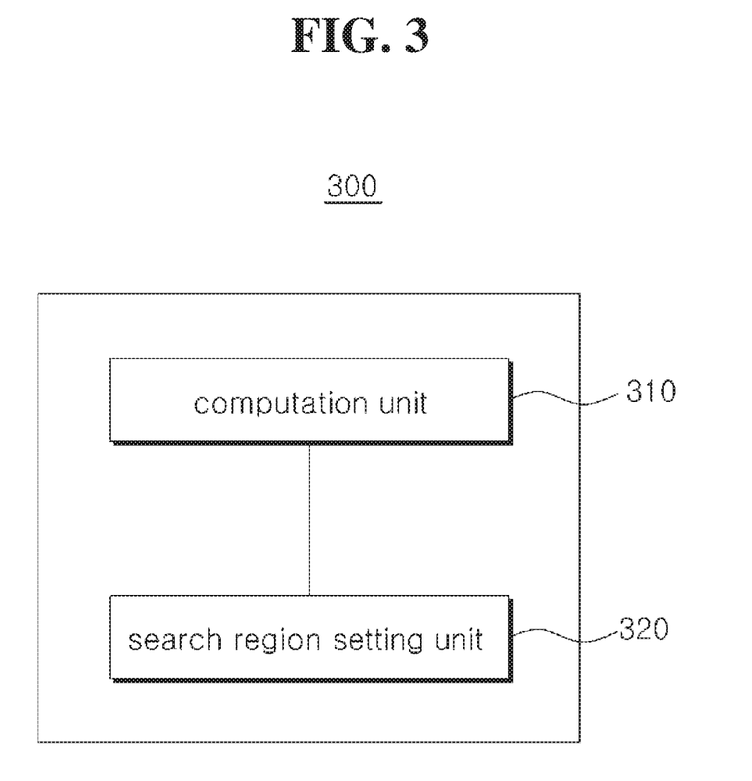
FIG. 3 illustrates the general composition of an apparatus for setting a search region for motion vector prediction according to an embodiment of the present invention.

FIG. 3 illustrates the general composition of an apparatus for setting a search region for motion vector prediction (hereinafter referred to as a "search region setting apparatus") according to an embodiment of the present invention.

Referring to FIG. 3, the search region setting apparatus 300 according to an embodiment of the present invention can include a computation unit 310 and a search region setting unit 320.

For a block of which the motion vector is to be predicted (hereinafter referred to as the "target block"), the search region setting apparatus 300 according to an embodiment of the present invention may first determine statistical properties for setting a search region for the target block by using motion vectors predicted for a multiple number of blocks (hereinafter referred to as "adjacent blocks") that are positioned adjacent to the target block at the current time, with the aim of quickly predicting the motion vector.

With conventional techniques for predicting motion vectors, there is no subdivision of the search region, so that there is a limit in determining the search area for the movement of a target block by using the motion vectors of adjacent blocks, and the search for motion vector prediction may be performed in unnecessary areas. To resolve this problem, the present invention subdivides the statistical properties of the adjacent blocks and adaptively sets the search region according to the subdivided properties.

Figure 4:
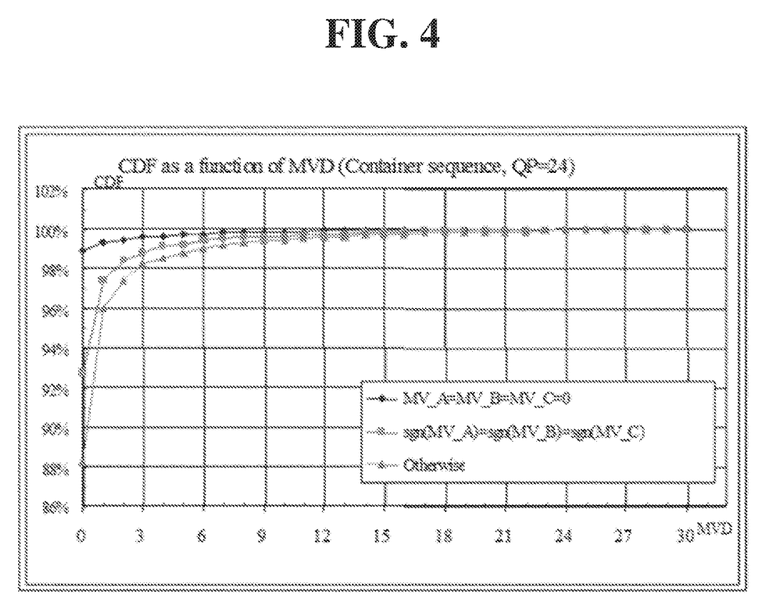
FIG. 4 illustrates an example of a cumulative distribution function of the absolute values of the MVD for a target block according to motion vectors predicted for adjacent blocks.

FIG. 4 illustrates an example of a cumulative distribution function (CDF) of the absolute values of the MVD for a target block according to motion vectors predicted for adjacent blocks.

Referring to FIG. 4, it can be seen that the probability of the motion vector of a target block having a relatively small value is very high if all of the motion vectors of the adjacent blocks are "0" (MV_A=MV_B=MV_C=0). Also, it can be seen that there is a high probability of the motion vector of the target block having a small value in cases where the motion vectors of the adjacent blocks have the same directionality (sgn(MV_A)=sgn(MV_B)=sgn(MV_C)).

Referring to this, it can be seen that the amount of computation and the computation time required during the prediction of a motion vector can be reduced by variably setting the motion search region for a target block according to the properties of the motion vectors of adjacent blocks so as to preclude unnecessary search areas. In other words, the differences between the motion vectors of adjacent blocks and the origin vector (i.e. the PMV) of the search region for a target block can be utilized as a statistical property for expressing the degree of uniformity of the motion vectors and determining the motion search region.

To this end, the computation unit 310 may compute the difference between the origin vector (PMV) of the search region for a target block and each of the predictive motion vectors of multiple adjacent blocks, and may compute the sum of the absolute values of the above differences. This sum of absolute values of the differences can be expressed as Equation 5 shown below.

$$SDMV(i) = \sum_{k=A}^{C} |PMV(i) - MV_k(i)| \quad \text{[Equation 5]}$$

Here, SDMV (Sum of absolute Difference Motion Vector) (i) represents the sum of the absolute values of the above differences, and $MV_k(i)$ represents the motion vector predicted for block k. (As described above for FIG. 1, it is assumed in Equation 5 that there are three blocks adjacent to the target block—block A, block B, and block C.)

Also, i represents the horizontal direction and vertical direction of a vector, as described above. That is, the computation unit 310 can compute a sum of absolute values of the differences (SDMV) for the horizontal direction and the vertical direction. In other words, the computation unit 310 can compute the differences between the horizontal component of the origin vector and the horizontal components of the motion vectors of the multiple adjacent blocks and then compute the sum of absolute values of the differences in horizontal components, or can compute the differences between the vertical component of the origin vector and the vertical components of the motion vectors of the multiple adjacent blocks and then compute the sum of absolute values of the differences in vertical components.

As such, the SDMV, which represents the degree of closeness of the motion vectors of adjacent blocks, may have a very small value if the movements of the adjacent blocks are uniform, and conversely may have a very large value if the motion vectors of the adjacent blocks have different directionalities or are non-uniform.

The search region setting apparatus 300 according to an embodiment of the present invention can set the search region by using this property of the SDMV. In other words, the search region setting unit 320 can set the range value for the search region of a target block by using at least one of the sum of absolute values of the differences (SDMV) and the directionalities of the predictive motion vectors for the multiple adjacent blocks.

In this case, the search region setting unit 320 can also set the range value of the search region for a target block for each of a horizontal direction and a vertical direction, similar to the computation unit 310. In other words, the search region setting unit 320 can set the range value of the search region for a horizontal direction by using at least one of the sum of absolute values of the differences (SDMV) in horizontal components and the directionalities of the motion vectors of the multiple adjacent blocks, or can set the range value of the search region for a vertical direction by using at least one of the sum of absolute values of the differences (SDMV) in vertical components and the directionalities of the motion vectors of the multiple adjacent blocks.

The range value of a search region can be a half-width value of the search region centered at the origin vector (PMV), as described above, for each of the horizontal direction and the vertical direction.

According to an embodiment of the present invention, the search region setting unit 320 can set a minimum range value and a maximum range value of the search region for a target block for the horizontal direction and the vertical direction differently for different modes, and can set the range value of the search region as a value that is greater than or equal to the minimum range value and smaller than or equal to the maximum range value.

Here, the target block can belong to one of a multiple number of modes, where the modes can include at least one of a "first mode" in which the sum of absolute values of the differences (SDMV) is 0, a "second mode" in which the sum of absolute values of the differences (SDMV) is smaller than or equal to 1 and the directions of the motion vectors of the adjacent blocks are the same, a "third mode" in which the sum of absolute values of the differences (SDMV) is greater than 1 and the directions of the motion vectors of the adjacent blocks are the same, and a "fourth mode" in which the sum of absolute values of the differences (SDMV) is not 0 and the directions of the motion vectors of the adjacent blocks are different.

More specifically, according to an embodiment of the present invention, if the target block belongs to the first mode, the search region setting unit 320 can set at least one of the minimum range value and the maximum range value of the search region by using Equation 6 shown below.

$$SR_{min} = 0$$ [Equation 6]
$$SR_{max} = \frac{\omega}{4}$$

Here, $SR_{min}$ represents the minimum range value of the search region, $SR_{max}$ represents the maximum range value of the search region, and $\omega$ represents a range value set beforehand for the search region.

Also, according to an embodiment of the present invention, if the sum of absolute values of the differences (SDMV) is smaller than or equal to 1 and the motion vectors of the adjacent blocks have the same direction, the search region setting unit 320 can set at least one of the minimum range value and the maximum range value of the search region by using Equation 7 shown below.

$$SR_{min} = \frac{\omega}{16}$$ [Equation 7]
$$SR_{max} = \frac{\omega}{4}$$

Also, according to an embodiment of the present invention, if the sum of absolute values of the differences (SDMV) is greater than 1 and the motion vectors of the adjacent blocks have the same direction, the search region setting unit 320 can set at least one of the minimum range value and the maximum range value of the search region by using Equation 8 shown below.

$$SR_{min} = \frac{\omega}{8}$$ [Equation 8]
$$SR_{max} = \frac{\omega}{2}$$

Also, according to an embodiment of the present invention, if the sum of absolute values of the differences (SDMV) is not 0 and the motion vectors of the adjacent blocks have different directions, the search region setting unit 320 can set at least one of the minimum range value and the maximum range value of the search region by using Equation 9 shown below.

$$SR_{min} = \frac{\omega}{8}$$ [Equation 9]
$$SR_{max} = \omega$$

In summary, the search region setting unit 320 can set the minimum range value and the maximum range value of the search region according to Table 1 shown below.

TABLE 1

| mode (k) | | $SR_{min}$ | $SR_{max}$ |
|---|---|---|---|
| | 1. SDMV = 0 | 0 | $\omega/4$ |
| directions of motion | 2. SDMV ≤1 | $\omega/16$ | $\omega/4$ |
| vectors are the same | 3. otherwise | $\omega/8$ | $\omega/2$ |
| | 4. otherwise | $\omega/8$ | $\omega$ |

If the search region is set using the statistical properties of adjacent blocks, as described above, errors can occur in the prediction of motion vectors in certain images according to a global movement of the image.

Figure 5:
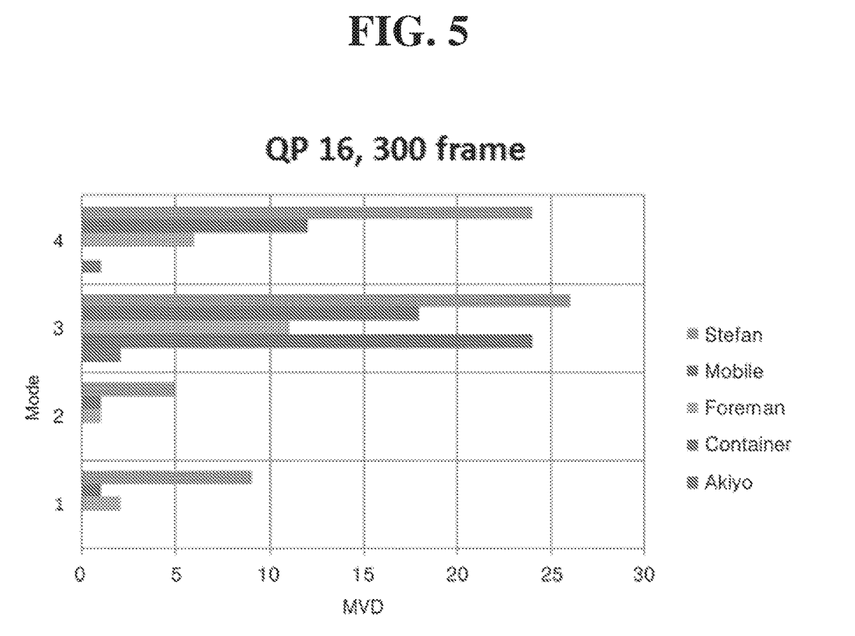
FIG. 5 illustrates the distribution of motion vector differences (MVD) according to the global motion properties of a CIF image.

FIG. 5 illustrates the distribution of motion vector differences (MVD) according to the global motion properties of a common intermediate format (CIF) image.

Referring to FIG. 5, it can be seen that, even if the motion vector prediction is performed for different modes according to the statistical properties of the adjacent blocks, images having large movements such as Stefan and Mobile images have large distributions of MVD, whereas images having small movements such as Akiyo and Container have small distributions of MVD.

From this result, it can be seen that in order to predict a motion vector more accurately, not only the local statistics of movements in the image but also the movement statistics of the entire image (i.e. global statistics of movements in the image) should be considered in the setting of the search region for motion vector prediction.

Figure 6:
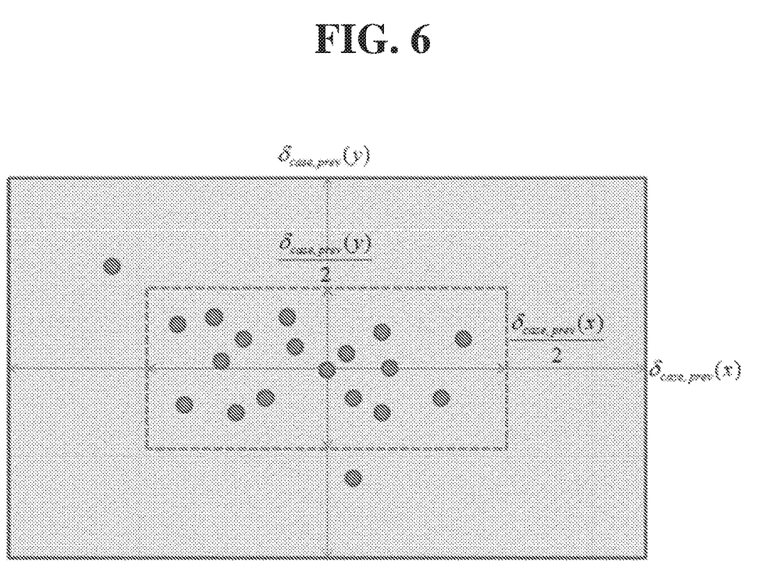
FIG. 6 illustrates an example of a cumulative distribution function of the absolute values of the MVD for multiple blocks within an image.

FIG. 6 illustrates an example of a cumulative distribution function of the absolute values of the motion vector differences (MVD) for multiple blocks within an image.

In FIG. 6, the dots correspond to the motion vector differences (MVD) of at least one previous target blocks that belong to the same mode as the mode of the target block, from among two or more previous target blocks for which motion vector prediction was performed before the target block.

Here, the cumulative statistical distribution of the motion vector differences (MVD) show motion vector components that will actually be encoded in the image and can be utilized as a technique for representing the motion properties of the image. Also, the closer the distribution of the motion vector differences (MVD) is to the origin, the smaller the degree of movement the image can be expected to have.

According to an embodiment of the present invention, the search region setting unit 320 can generate a temporary range value of the search region by using the statistics of the motion vector differences (MVD) for two or more previous target blocks, for which motion vector prediction was performed prior to the target block, and can set the range value of the search region as the median of the search region's minimum range value, maximum range value, and the temporary range value above. In this case, the motion vector difference (MVD) for each previous target block is the difference between the predictive motion vector for the previous target block and the origin vector of the search region for the previous target block. Also, the setting of the range value for the search region can be expressed by Equation 10 shown below.

$$\delta_{cur}(i) = \min(\max(\delta_{case,temp}(i), SR_{min}(i)), SR_{max}(i))$$

Here, $\delta_{cur}(i)$ represents the set range value of the search region, $\delta_{case,temp}(i)$ represents the temporary range value, max( ) is a function that outputs the maximum value from among the inputted values, and min( ) is a function that outputs the minimum value from among the inputted values.

In this case, the search region setting unit 320 can generate a temporary range value for the search region by using the statistics of the motion vector differences (MVD) for at least one previous target blocks that belong to the same mode as the mode of the target block from among two or more previous target blocks, but with the temporary range value for the target block set by using the range value of the search region for the previous target block for which the prediction of the motion vector was performed immediately before the target block (the immediately previous search region range value), from among the at least one previous target blocks that belong to the same mode.

To be more specific, according to an embodiment of the present invention, in cases where the number of motion vector differences (MVD) of the at least one previous target blocks that are positioned within the temporary search region set by a fraction of the immediately previous search region range value is greater than or equal to a first threshold value, the search region setting unit 320 can set the temporary value for the target block as a fraction of the immediately previous search region range value mentioned above.

For instance, as in the example shown in FIG. 6, suppose that a first temporary search region, shown by solid lines, is set by the search region range value (i.e. the immediately previous search region range value: $\delta_{case,prev}$) of the immediately previous target block which belongs to the same mode as the target block and for which the prediction of the motion vector was performed immediately before the target block, and that the fraction described above is ½, so that a second temporary search region, shown by dotted lines, set by a fraction value (½) of the immediately previous search region range value (i.e. $\delta_{case,prev}/2$). If the number of MVD within the second temporary search region is greater than or equal to a first threshold value (e.g. 90), then the search region setting unit 320 can set the temporary range value for the target block as a fraction of the immediately previous search region range value (i.e. $\delta_{case,prev}/2$), as shown in Equation 11 below.

$$\delta_{case,temp}(i) = \frac{\delta_{case,prev}(i)}{2} \qquad \text{[Equation 11]}$$

Here, $\delta_{case,temp}(i)$ represents the temporary range value for the target block.

Also, according to an embodiment of the present invention, in cases where the number of motion vector differences (MVD) of the at least one previous target blocks that are positioned within the temporary search region set by a fraction of the immediately previous search region range value is smaller than or equal to a second threshold value, the search region setting unit 320 can set the temporary range value for the target block as an integer multiple of the immediately previous search region range value.

For instance, in the example shown in FIG. 6, if the number of MVD within the second temporary search region is smaller than or equal to a second threshold value (e.g. 70), then the search region setting unit 320 can set the temporary range value for the target block as an integer multiple of the immediately previous search region range value (e.g. twice the value), as shown in Equation 12 below.

$$\delta_{case,temp}(i) = 2 \times \delta_{case,prev}(i) \qquad \text{[Equation 12]}$$

Also, according to another embodiment of the present invention, in cases where the number of motion vector differences (MVD) of the at least one previous target blocks within the temporary search region set by a fraction of the immediately previous search region range value is smaller than the first threshold value and greater than the second threshold value, the search region setting unit 320 can set the temporary value for the target block as the immediately previous search region range value.

For instance, in the example shown in FIG. 6, if the number of MVD within the second temporary search region is greater than the second threshold value (e.g. 70) and smaller than the first threshold value (e.g. 90), then the search region setting unit 320 can set the temporary range value for the target block as the immediately previous search region range value, as shown in Equation 13 below.

$$\delta_{case,temp}(i) = \delta_{case,prev}(i) \qquad \text{[Equation 13]}$$

The descriptions above relate to compensating the motion search region by evaluating the degree of closeness of the MVD of blocks of the same mode as the target block for which the prediction of motion vectors (i.e. encoding) has been performed. This takes advantage of the property that the MVD of the target block is more likely to follow the values of previous target blocks that have already undergone motion vector prediction if there are more statistical property modes within a region of a particular size and if the MVD of the blocks are more closely positioned to a small value.

If the target block belongs to the first mode and the temporary range value based on the cumulative statistical distribution of MVD is set to "0", then the final range value of the search region set according to Equation 10 above would be determined as "0", whereby the immediately previous search region range value for the target block and for all subsequent blocks would also be 0, resulting in the error of the temporary search region being nonexistent.

To prevent this error, the search region setting unit 320 can compulsorily set the temporary range value as "1" if the $SAD(SAD_{cur})$ of the target block and the $SAD(SAD_{prev})$ of the immediately previous target block satisfy the relationship shown in Equation 14 below.

$$2 \times SAD_{prev} \leq SAD_{cur} \quad \text{[Equation 14]}$$

Thus, the final search region for the motion vector can be expressed as Equation 15 shown below.

$$-\delta_{cur}(x) \leq dx \leq \delta_{cur}(x)$$

$$-\delta_{cur}(y) \leq dy \leq \delta_{cur}(y) \quad \text{[Equation 15]}$$

Also, the search region setting apparatus 300 according to an embodiment of the present invention, together with a motion vector search unit (not shown), can form a motion vector search apparatus (not shown).

In this case, in order to further reduce the amount of computation and the computation time expended during the search of a motion vector, the motion vector search unit (not shown) can perform the search of the motion vector within a search region set as described above, by using a variable step search (VSS) technique. The conventional variable step search technique can be performed as follows.

[Operation 1] In Operation 1, the maximum search step $(\max_{step}(i))$ and the step size (Step_Size(i)) may be set as in Equation 16 shown below, for the finally set search region.

$$\max_{step}(i) = \max_{M(i)} \lfloor [2^{M(i)} < \delta_{cur}(i)] \rfloor + 1$$

$$\text{Step\_Size}(i) = 2^{M(i)}$$

Here, $\lfloor A \rfloor$ represents the maximum integer value that is not greater than A.

[Operation 2] In Operation 2, eight points having the same distance as the step size (Step_Size(i)) from the search origin are selected, the SAD computation is performed for the search origin and the selected eight points, and the point at which the SAD is the smallest is set as the search origin for the next operation (Operation 3).

[Operation 3] In Operation 3, the step size (Step_Size(i)) is reduced in half, and eight points having the same distance as the step size (Step_Size(i)) from the search origin set in Operation 2 are selected, for which the SAD computation is performed again. Likewise, the point at which the SAD is the smallest is set as the search origin for the next operation.

The repetition of the operations above (i.e. the variable step search technique) may be ended when the step size (Step_Size(i)) is "1" for both the horizontal direction and the vertical direction.

Figure 7:
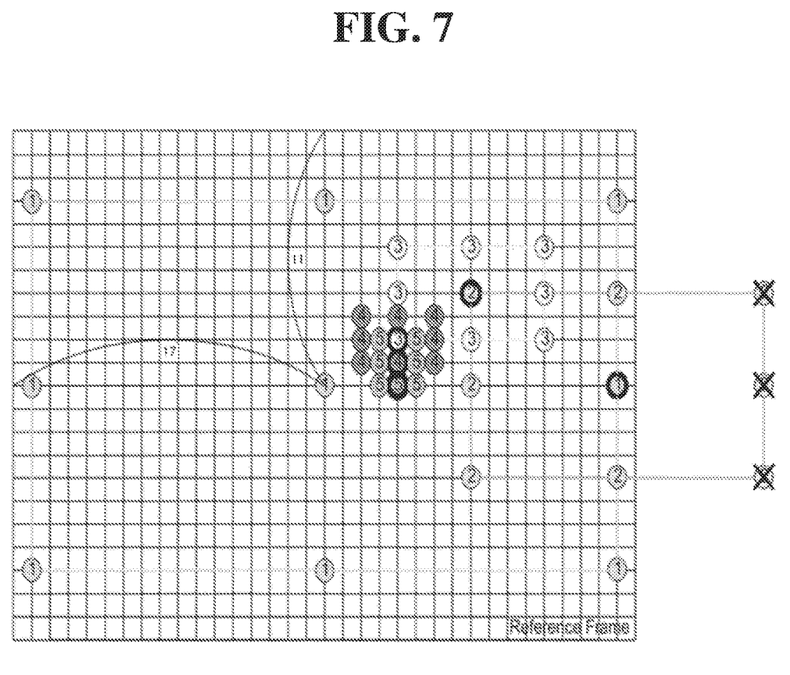
FIG. 7 illustrates an example of a variable stepwise search technique when the range value of the search region in the horizontal direction is "17" and the range value of the search region in the vertical direction is "11".

FIG. 7 illustrates an example of a variable stepwise search technique when the range value of the search region in the horizontal direction $(\delta_{cur}(x))$ is "17" and the range value of the search region in the vertical direction $(\delta_{cur}(y))$ is "11".

In this case, the maximum search steps for the horizontal direction and the vertical direction are "$\max_{step}(x)=5$" and "$\max_{step}(y)=4$", respectively, and the initial step sizes for the horizontal direction and the vertical direction are "Step_Size(x))=16" and "Step_Size(y))=8", respectively.

Figure 8:
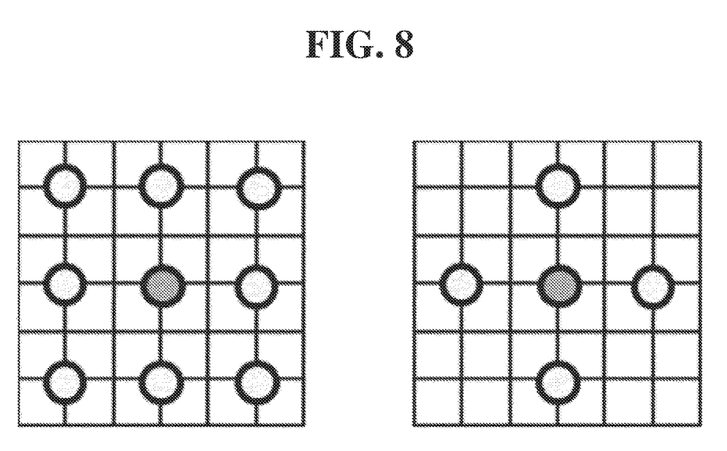
FIG. 8 illustrates an example of a square type and a cross type search when the step size (Step_Size(i)) is 2.

Blocks that correspond to the mode based on local statistical properties described above and to the first mode in setting the search region are blocks that are predicted to be highly likely to have their motion vectors determined within a small region with respect to the search origin. Therefore, in order that many blocks may belong to the first mode and the amount of computation within the search region may be reduced in the case of an image having little movement, a cross type search method rather than a square type search method, as illustrated in FIG. 8, can be used for blocks belonging to the first mode. FIG. 8 illustrates an example of a square type and a cross type search when the step size (Step_Size(i)) is 2.

Figure 9:
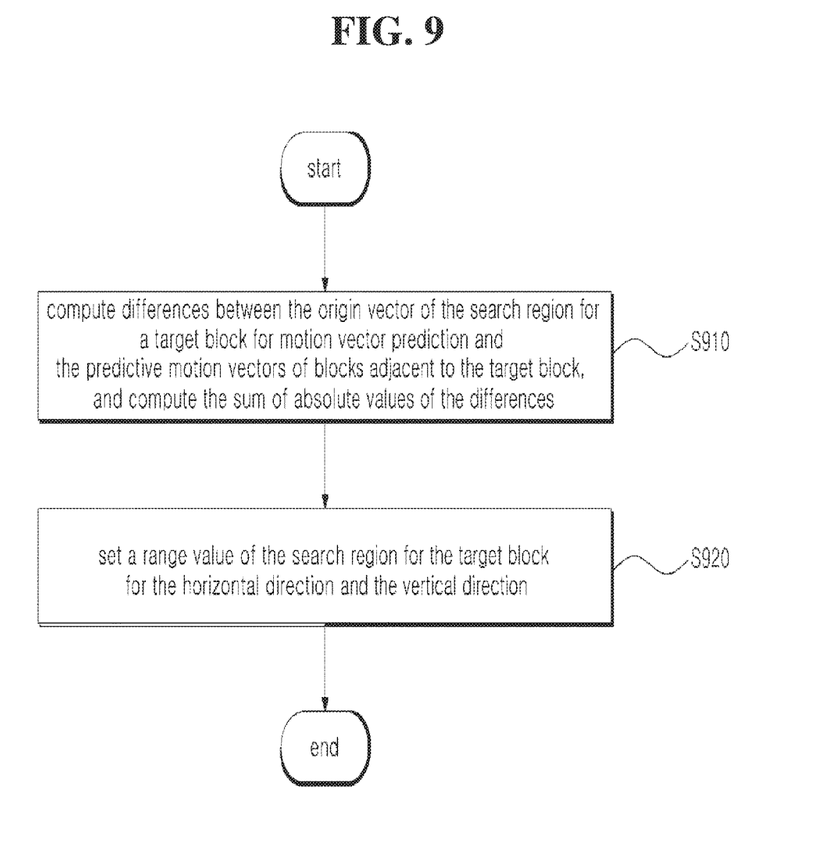
FIG. 9 is a flowchart illustrating the overall flow of a method for setting a search region for predicting motion vectors according to an embodiment of the present invention.

FIG. 9 is a flowchart illustrating the overall flow of a method for setting a search region for predicting motion vectors according to an embodiment of the present invention.

First, in step S910, the differences between the origin vector of the search region for a target block for motion vector prediction and the predictive motion vectors for blocks adjacent to the target block may be computed, and the sum of the absolute values of these differences may be computed.

Then, in step S920, the range value of the search region for the target block may be set by using at least one of the sum of absolute values of the differences and the directionalities of the predictive motion vectors for the adjacent blocks.

According to an embodiment of the present invention, the computation of the above differences and the computation of the sum of absolute values of the differences may be performed for each of the horizontal direction and the vertical direction in step S910, and the range value of the search region for the target block may be set for each of the horizontal direction and the vertical direction in step S920. In this case, the range value of the search region can be a half-width value of the search region centered at the origin vector for each of the horizontal direction and the vertical direction, as described above.

Also, according to an embodiment of the present invention, a minimum range value and a maximum range value of the search region for the target block may be set for each of the horizontal direction and the vertical direction differently for a multiple number of modes in step S920, with the range value of the search region set as a value that is greater than or equal to the minimum range value and smaller than or equal to the maximum range value. The target block can belong to one of the multiple number of modes, where the modes can include at least one of a first mode in which the sum of absolute values of the differences is 0, a second mode in which the sum of absolute values of the differences is smaller than or equal to 1 and the directions of the motion vectors of the adjacent blocks are the same, a third mode in which the sum of absolute values of the differences is greater than 1 and the directions of the motion vectors of the adjacent blocks are the same, and a fourth mode in which the sum of absolute values of the differences is not 0 and the directions of the motion vectors of the adjacent blocks are different.

The above describes an embodiment of the present invention relating to a method for setting a search region for motion vector prediction. The elements of the search region setting apparatus 300 described above with reference to FIG. 3 can also apply to this embodiment. Thus, redundant descriptions will be omitted.

While the present invention has been described above using particular examples, including specific components, by way of limited embodiments and drawings, it is to be appreciated that these are provided merely to aid the overall understanding of the present invention, the present invention is not to be limited to the embodiments above, and various modifications and alterations can be made from the disclosures above by a person having ordinary skill in the technical field to which the present invention pertains. Therefore, the spirit of the present invention must not be limited to the embodiments described herein, and the scope of the present invention must be regarded as encompassing not only the claims set forth below, but also their equivalents and variations.

The invention claimed is:

1. A video coding method for predicting a motion vector in a search region, the method comprising:

computing differences between an origin vector of a search region for a target block for motion vector prediction and predictive motion vectors of a plurality of blocks adjacent to the target block for each of a horizontal and a vertical direction, and computing a sum of absolute values of the differences for each of the horizontal and the vertical direction;

setting a range value of the search region for the target block for each of the horizontal and the vertical direction by using at least one of the sum of absolute values of the differences and a directionality of the predictive motion vectors for the plurality of adjacent blocks;

setting a minimum range value and a maximum range value of the search region for the target block in the horizontal and the vertical directions for each of a plurality of modes;

setting the range value of the search region as a value greater than or equal to the minimum range value and smaller than or equal to the maximum range value; and performing video coding by predicting a motion vector within the search region for the target block derived from a video to be coded, wherein the target block belongs to one of the plurality of modes, the plurality of modes including at least two of a first mode in which the sum of absolute values of the differences is 0, a second mode in which the sum of absolute values of the differences is smaller than or equal to 1 and directions of the motion vectors of the adjacent blocks are the same, a third mode in which the sum of absolute values of the differences is greater than 1 and the directions of the motion vectors of the adjacent blocks are the same, and a fourth mode in which the sum of absolute values of the differences is not 0 and the directions of the motion vectors of the adjacent blocks are different.

2. The video coding method for predicting a motion vector in a search region according to claim 1, wherein the range value of the search region is a half-width value of the search region centering on the origin vector in the horizontal direction and the vertical direction.

* * * * *